United States Patent
Kim et al.

(10) Patent No.: US 10,991,954 B2
(45) Date of Patent: Apr. 27, 2021

(54) STAINLESS STEEL FOR POLYMER FUEL CELL SEPARATION PLATE HAVING IMPROVED HYDROPHILICITY AND CONTACT RESISTANCE AND METHOD FOR MANUFACTURING SAME

(71) Applicant: POSCO, Pohang-si (KR)

(72) Inventors: Jong Hee Kim, Daejeon (KR); Kwang Min Kim, Pohang-si (KR); Jae Hwa Lee, Pohang-si (KR); Yang Jin Chung, Seongnam-si (KR); Ki Hoon Jo, Pohang-si (KR); Bo Sung Seo, Pohang-si (KR)

(73) Assignee: POSCO, Pohang-si (KR)

( * ) Notice: Subject to any disclaimer, the term of this patent is extended or adjusted under 35 U.S.C. 154(b) by 180 days.

(21) Appl. No.: 16/064,891

(22) PCT Filed: Dec. 21, 2016

(86) PCT No.: PCT/KR2016/015047
§ 371 (c)(1),
(2) Date: Jun. 21, 2018

(87) PCT Pub. No.: WO2017/111475
PCT Pub. Date: Jun. 29, 2017

(65) Prior Publication Data
US 2019/0013525 A1      Jan. 10, 2019

(30) Foreign Application Priority Data

Dec. 23, 2015  (KR) .................. 10-2015-0184787

(51) Int. Cl.
*H01M 8/021*      (2016.01)
*C22C 38/28*      (2006.01)
(Continued)

(52) U.S. Cl.
CPC .............. *H01M 8/021* (2013.01); *C21D 1/28* (2013.01); *C21D 6/002* (2013.01); *C21D 6/005* (2013.01);
(Continued)

(58) Field of Classification Search
CPC ................................................... H01M 8/021
(Continued)

(56) References Cited

U.S. PATENT DOCUMENTS 9,290,845 B2   3/2016   Kim et al.
9,531,014 B2   12/2016  Nagoshi et al.
(Continued)

FOREIGN PATENT DOCUMENTS

EP   2 770 567 A1   8/2014
EP   2770078 A1    8/2014
(Continued)

OTHER PUBLICATIONS

Korean Notice of Allowance issued in Application No. 10-2015-0184787 dated May 24, 2017, with English translation.
(Continued)

*Primary Examiner* — Ian A Rummel
(74) *Attorney, Agent, or Firm* — Morgan, Lewis & Bockius LLP

(57) ABSTRACT

Stainless steel with improved hydrophilicity and contact resistance for a Polymer Electrolyte Membrane Fuel Cell (PEMFC) separator, and a method of manufacturing the stainless steel Stainless steel are disclosed. Stainless steel for a Polymer Electrolyte Membrane Fuel Cell (PEMFC) separator according to an embodiment of the present disclosure may include: by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34%

(Continued)

of Cr, 0 to 0.6% of V (excluding 0), 0 to 0.5% of Ti (excluding 0), 0 to 0.5% of Nb (excluding 0), and the remainder comprising iron (Fe) and other unavoidable impurities, wherein a plurality of patterns may be formed on a surface of the stainless steel in a direction that is inclined with respect to a rolling direction, and the plurality of patterns are arranged repeatedly in the rolling direction.

14 Claims, 8 Drawing Sheets

(51) Int. Cl.

| | |
|---|---|
| C22C 38/26 | (2006.01) |
| C22C 38/24 | (2006.01) |
| C22C 38/04 | (2006.01) |
| C22C 38/02 | (2006.01) |
| C22C 38/00 | (2006.01) |
| C21D 9/46 | (2006.01) |
| C21D 8/02 | (2006.01) |
| C21D 6/00 | (2006.01) |
| C25F 1/06 | (2006.01) |
| H01M 8/1018 | (2016.01) |
| C23C 22/50 | (2006.01) |
| C23G 1/08 | (2006.01) |
| C21D 7/02 | (2006.01) |
| C21D 1/28 | (2006.01) |
| C21D 7/04 | (2006.01) |
| C22C 38/22 | (2006.01) |

(52) U.S. Cl.
CPC ............... *C21D 6/008* (2013.01); *C21D 7/02* (2013.01); *C21D 7/04* (2013.01); *C21D 8/02* (2013.01); *C21D 8/0205* (2013.01); *C21D 8/0236* (2013.01); *C21D 8/0242* (2013.01); *C21D 8/0247* (2013.01); *C21D 8/0278* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/22* (2013.01); *C22C 38/24* (2013.01); *C22C 38/26* (2013.01); *C22C 38/28* (2013.01); *C23C 22/50* (2013.01); *C23G 1/081* (2013.01); *C23G 1/086* (2013.01); *C25F 1/06* (2013.01); *H01M 8/1018* (2013.01); *H01M 2008/1095* (2013.01)

(58) Field of Classification Search
USPC ...................................................... 429/195.1
See application file for complete search history.

(56) References Cited

U.S. PATENT DOCUMENTS

| | | | | |
|---|---|---|---|---|
| 2008/0032169 | A1* | 2/2008 | Fabian | H01M 8/0245 |
| | | | | 429/414 |
| 2011/0250522 | A1* | 10/2011 | Kaminaka | H01M 8/0226 |
| | | | | 429/479 |
| 2011/0294042 | A1* | 12/2011 | Kim | C22C 38/001 |
| | | | | 429/516 |
| 2012/0276472 | A1* | 11/2012 | Ide | C22C 38/26 |
| | | | | 429/512 |
| 2014/0272668 | A1 | 9/2014 | Nagoshi et al. | |

FOREIGN PATENT DOCUMENTS

| | | |
|---|---|---|
| JP | H08-269646 A | 10/1996 |
| JP | 2001-081542 A | 3/2001 |
| JP | 2003-342797 A | 12/2003 |
| JP | 3799090 B2 | 4/2006 |
| JP | 2007-026694 A | 2/2007 |
| JP | 2007-119856 A | 5/2007 |
| JP | 2008-291303 A | 12/2008 |
| JP | 2009-117114 A | 5/2009 |
| JP | 2009-209423 A | 9/2009 |
| JP | 2012-514297 A | 6/2012 |
| JP | 2014-534345 A | 12/2014 |
| JP | 2015-507091 A | 3/2015 |
| KR | 10-2005-0009232 A | 1/2005 |
| KR | 10-2010-0080379 A | 7/2010 |
| KR | 10-2011-0139825 A | 12/2011 |
| KR | 10-2012-0072824 A | 7/2012 |
| KR | 10-2012-0073646 A | 7/2012 |
| KR | 10-2013-0074216 A | 7/2013 |
| KR | 10-2013-0136713 A | 12/2013 |
| KR | 10-1410478 B1 | 6/2014 |
| KR | 10-1410479 B1 | 6/2014 |
| KR | 10-2014-0081161 A | 7/2014 |
| KR | 10-2014-0088886 A | 7/2014 |
| WO | 2008-013305 A1 | 1/2008 |
| WO | 20120133837 A1 | 10/2012 |
| WO | 2013-080533 A1 | 6/2013 |
| WO | 2017/105142 A1 | 6/2017 |

OTHER PUBLICATIONS

Korean Office Action issued in Application No. 10-2015-0184787 dated Feb. 15, 2017.
International Search Report issued in Application No. PCT/KR2016/015047 dated Mar. 24, 2017, with English translation.
European Office Action dated Jul. 1, 2019 issued in European Patent Application No. 16879342.0.
Japanese Notice of Refusal dated Jun. 25, 2019 issued in Japanese Patent Application No. 2018-526883 (with English translation).
English translation of Korean Office Action issued in Application No. 10-2015-0184787 dated Feb. 15, 2017.
Extended European Search Report issued in Application No. 16879342.0 dated Aug. 28, 2018.
Alfredo Calvimontes et al., "Topographical Anisotropy and Wetting of Ground Stainless Steel Surfaces", Materials, 2012, vol. 5, pp. 2773-2787.
"JFE443CT, Ni, Mo-Free Stainless steel with high corrosion resistance 21Cr Stainless Steel", JFE Steel Corporation, retrieved from the internet: www.jfe-steel.co/jp/en/products/stainless/catalog/gle-004.
Chinese Office Action dated Aug. 15, 2019 issued in Chinese Patent Application No. 201680075674.5 (with English translation).
Chinese Office Action dated Apr. 2, 2020 issued in Chinese Patent Application No. 201680075674.5 (with English translation).

* cited by examiner

[FIG. 1]
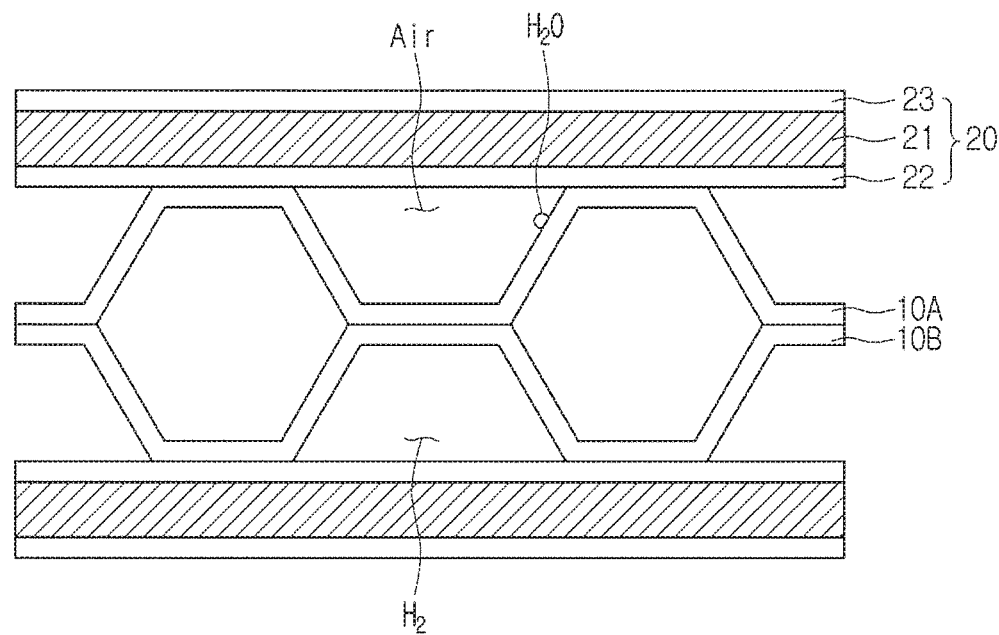
[FIG. 2]
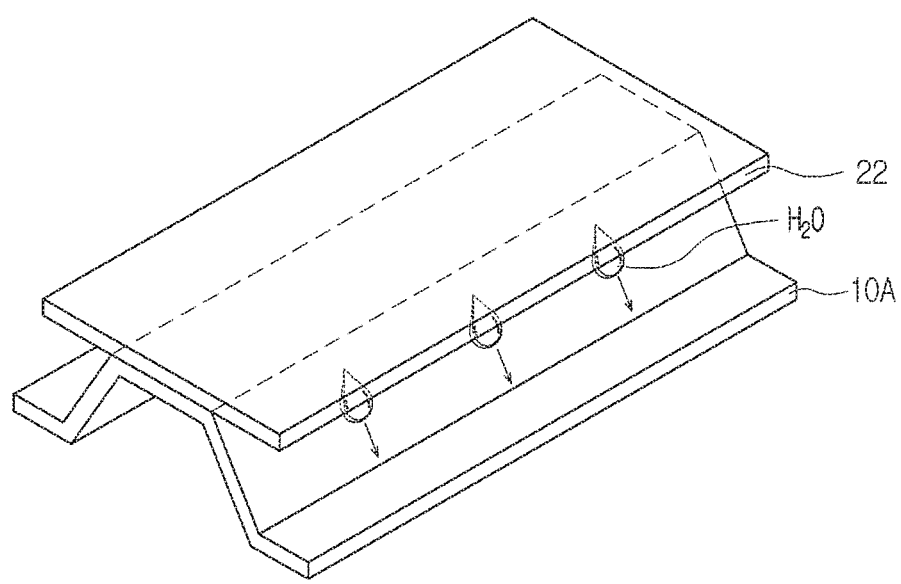

[FIG. 3]
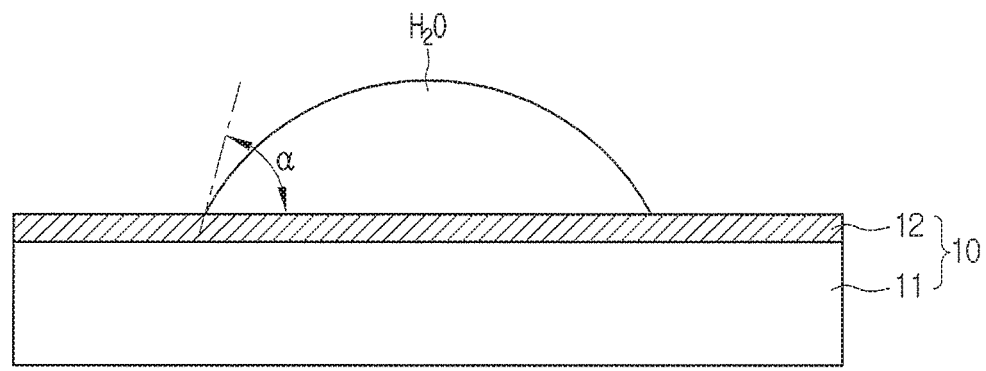
[FIG. 4]
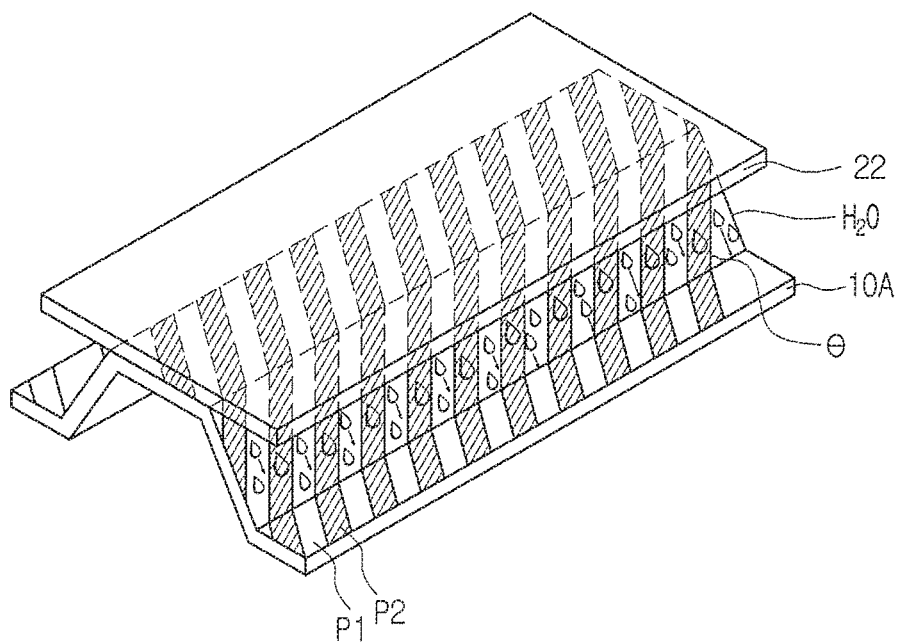

[FIG. 5]
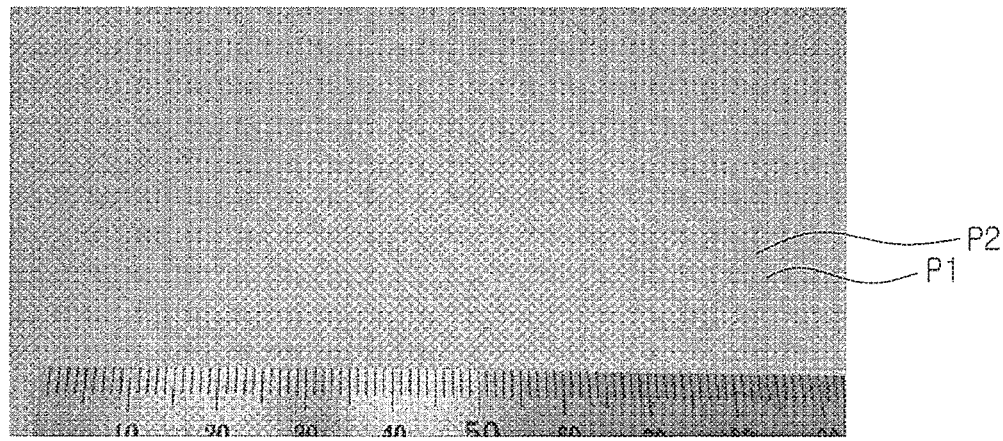
[FIG. 6]
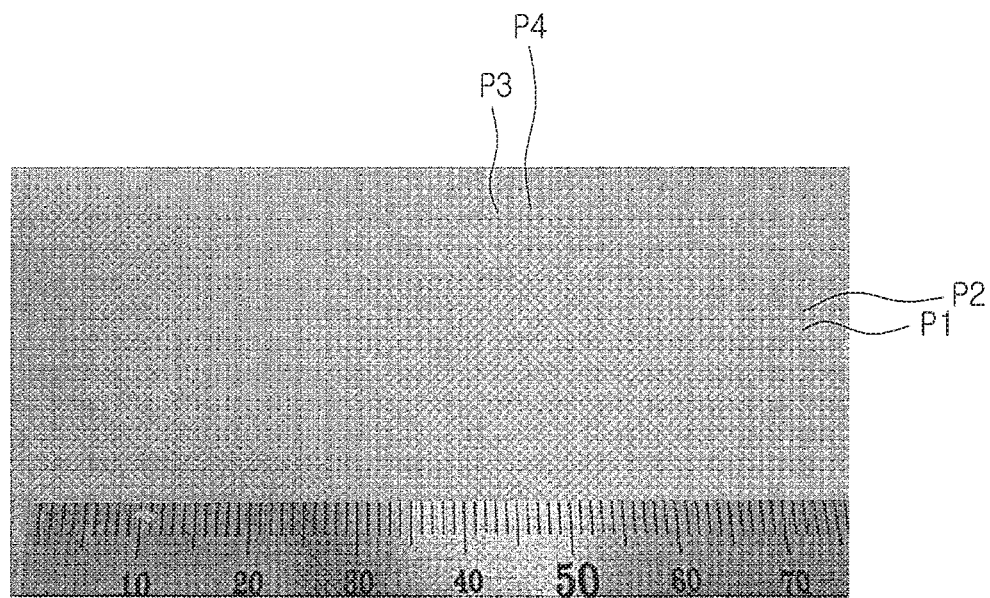

[FIG. 7]
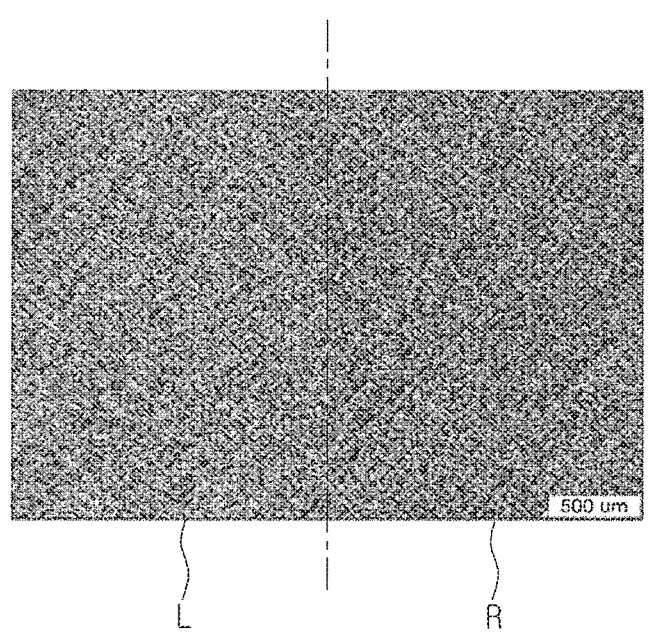
L    R

[FIG. 8]
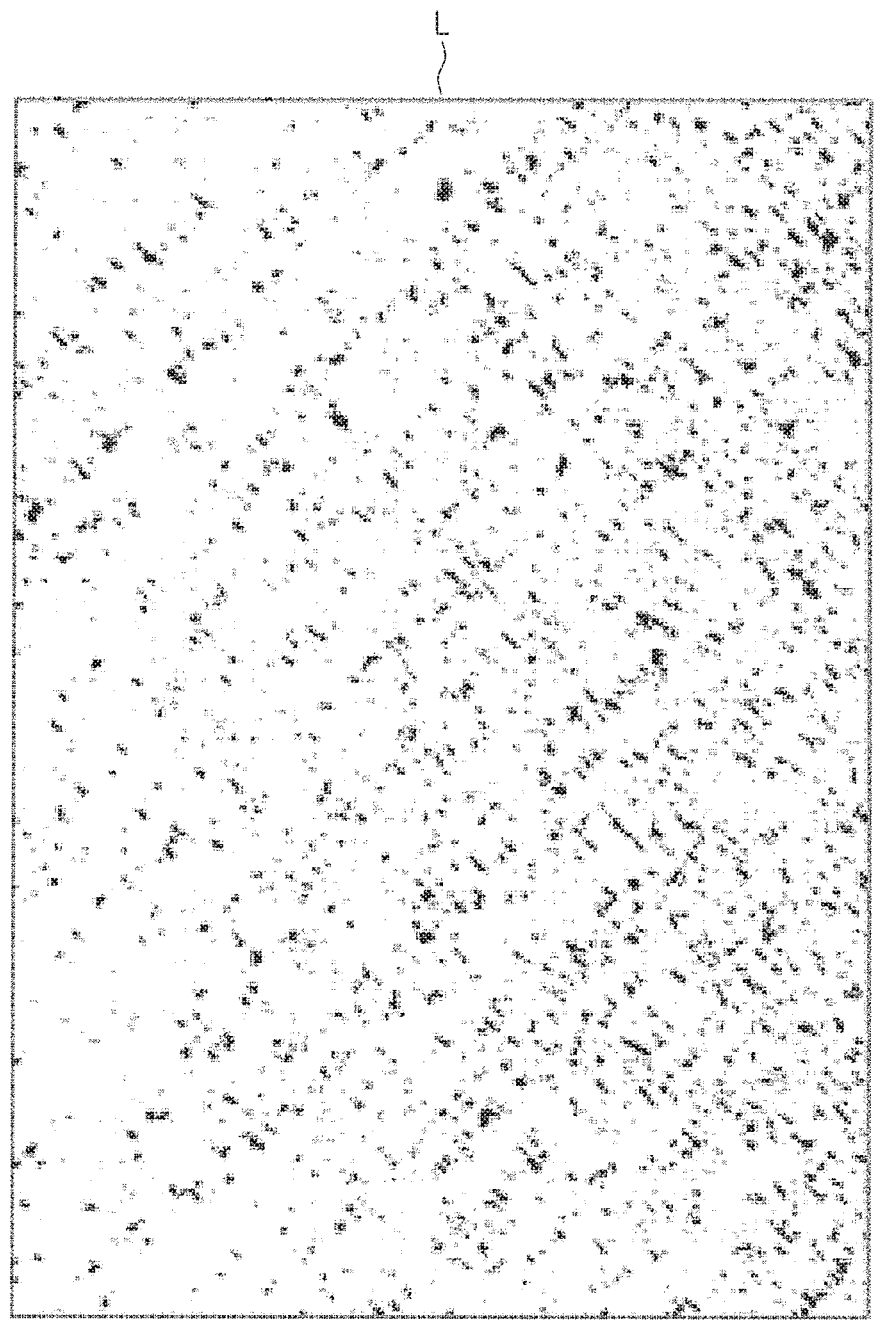

[FIG. 9]
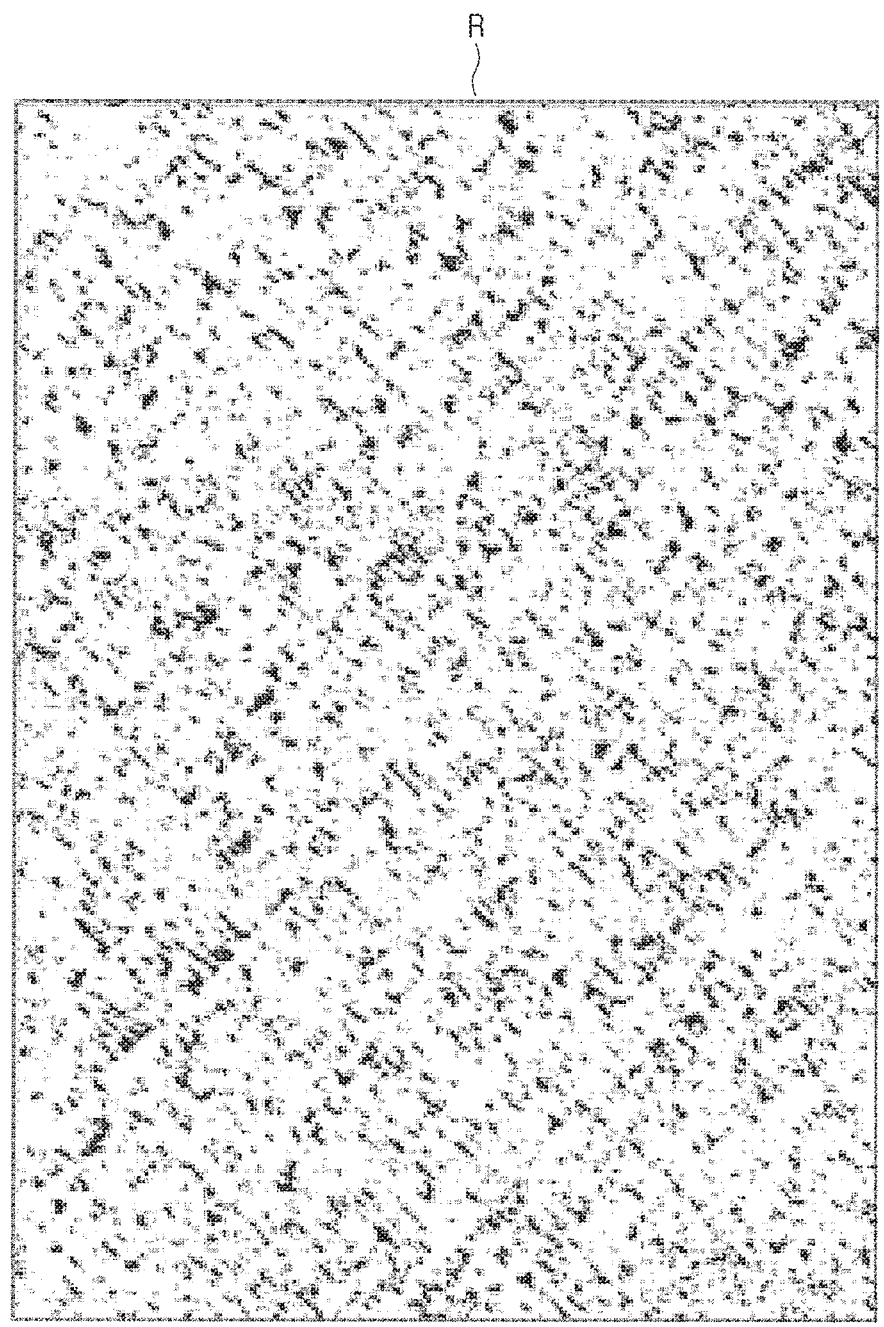

[FIG. 10]
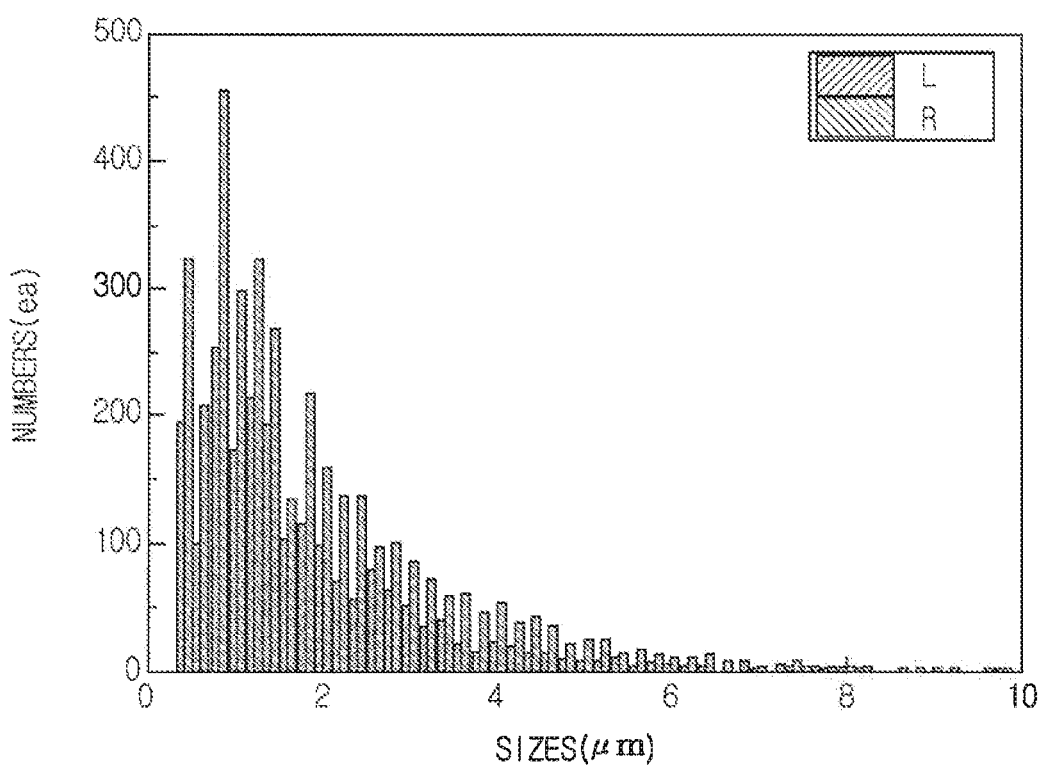

[FIG. II]
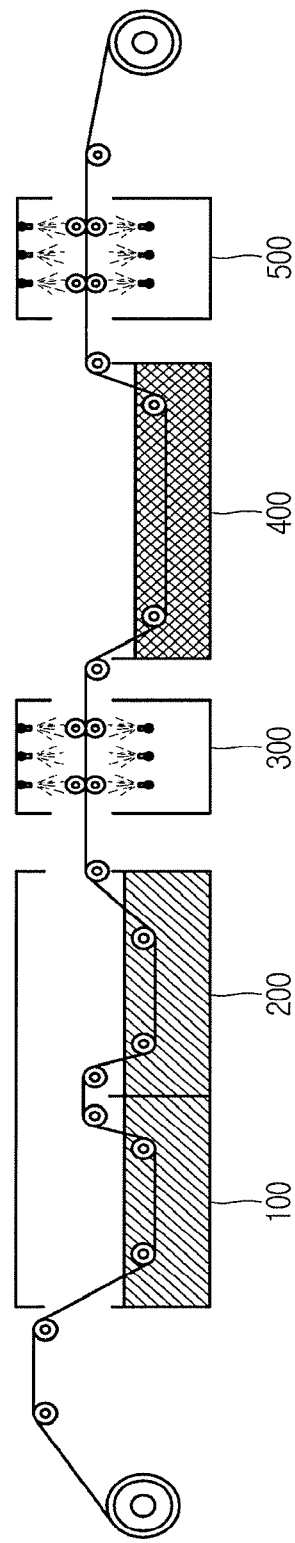

STAINLESS STEEL FOR POLYMER FUEL CELL SEPARATION PLATE HAVING IMPROVED HYDROPHILICITY AND CONTACT RESISTANCE AND METHOD FOR MANUFACTURING SAME

RELATED APPLICATIONS

This application is a national stage of International Application No. PCT/KR2016/015047, filed Dec. 21, 2016, which claims the benefit of Korean Application No. 10-2015-0184787 filed on Dec. 23, 2015, the disclosures of which are incorporated in their entirety by reference herein.

TECHNICAL FIELD

The present disclosure relates to stainless steel with improved hydrophilicity and contact resistance for a Polymer Electrolyte Membrane Fuel Cell (PEMFC) separator, and a method of manufacturing the stainless steel, and more particularly, to stainless steel for a Polymer Electrolyte Membrane Fuel Cell (PEMFC) separator, capable of improving corrosion resistance by removing a non-conductive film formed on the surface of the stainless steel and forming a new conductive film, while improving hydrophilicity and contact resistance without having to perform additional surface processing such as coating by stretching a stainless cold-rolled steel sheet to form a pattern through micro pits control on the surface of the steel sheet, and a method of manufacturing the stainless steel.

BACKGROUND ART

A Polymer Electrolyte Membrane Fuel Cell (PEMFC) is a fuel cell using a polymer film having hydrogen ion exchange properties as an electrolyte, and has low operation temperature of about 80° C. and high efficiency compared to other types of fuel cells. Also, the PEMFC has fast startup, high output density, and a simple main-body structure. For these reasons, the PEMFC can be used for vehicle or home.

A PEMFC has a unit cell structure in which gas diffusion layers and separators are stacked on both sides of a Membrane Electrode Assembly (MEA) consisting of an electrolyte, an anode electrode, and a cathode electrode. Several unit cells are connected in series to form a fuel cell stack.

The separators supply fuel (hydrogen and reformed gas) and an oxidizer (oxygen and air) to the electrodes of the fuel cell. In the separators, flow paths for discharging water which is an electrochemical reactant may be formed. The separators perform a function of mechanically supporting the MEA and the gas diffusion layers and a function of electrically connecting to the neighboring unit cells.

Typically, separators have been manufactured with a graphite material. However, recently, stainless steel is widely used to manufacture separators, in consideration of manufacturing cost, weight, etc. Stainless steel to be used to manufacture separators should have excellent corrosiveness in a strong acidic environment which is the operating environment of fuel cells, and have excellent corrosion resistance and conductivity in view of weight reduction, miniaturization, and productivity.

The flow path of the PEMFC separator is composed of a channel through which fuel or an oxidizer passes, and a land which is in contact with gas diffusion layers to function as an electrical passage. In order to easily supply reactants and easily discharge products, it is very important to control the shape and surface state of the flow path.

Generally, a PEMFC supplies reaction gas (fuel and oxidizer) after humidifying to a predetermined level or higher in order to improve conductivity of hydrogen ions in an electrolyte membrane.

Meanwhile, since water is generated by an electrochemical reaction in the cathode side, waterdrops are generated by the condensation of water vapor in the inside of the channels, the gas diffusion layers, or the electrodes if the dew point temperature of the reaction gas is higher than the operation temperature of the fuel cell.

This is called a flooding phenomenon. Due to the flooding phenomenon, the reaction gas flows non-uniformly, and is also diffused insufficiently to cause the lack of the reaction gas in the electrodes, resulting in degradation in performance of the PEMFC.

The flooding phenomenon may be generated even in the anode electrode by water passed through the electrolyte membrane, as well as in the cathode electrode. Particularly, when the gas flow path is clogged due to condensation water in the anode side, the lack of fuel gas is caused, resulting in irreversible damage of the electrodes.

This phenomenon is because when load current is forcedly applied in the lack of fuel gas, carbon supporting a catalyst of the anode reacts with water in order to produce electrons and protons in the state in which there is no fuel.

As the result of the reaction, the catalyst of the anode side is lost, which causes a reduction of an effective electrode area, resulting in degradation in performance of the fuel cell.

In order to prevent the flooding phenomenon, and to stabilize the performance of the fuel cell, a process for providing hydrophilicity to the surface to discharge water easily is needed.

In order to overcome the problem, typically, there was a trial for improving a water discharge characteristic by mechanically rubbing the surfaces of lands after molding separators to form scratches. However, this method had a disadvantage that process cost rises due to the additional process of forming scratches or that the uniformity of scratches cannot be secured.

Unlike this, there is a method of hydrophilizing the surface through plasma processing after a coating process. However, the method also has a disadvantage that process cost rises since it requires a plasma process in addition to a coating process Also, there is a method of forming a precious metal (Au) oxide or a titanium oxide ($TiO_2$) on the final product in order to secure hydrophilicity. However, there is a limit in commercializing the method, since molded separators should be coated one by one, which increases coating cost and process cost.

Also, in order to secure the surface having hydrophilicity, a method of forming a Si-rich layer on the surface was tried. However, if a Si oxide which is an insulating material is formed on the PEMFC separator, conductivity is reduced. Therefore, the Si oxide is not appropriate as a material for a PEMFC separator.

(Patent Document 0001) Korean Patent Registration No. 10-1410479
(Patent Document 0002) Korean Laid-open Patent Application No. 10-2013-0136713

DISCLOSURE

Technical Problem

The present disclosure is directed to providing stainless steel for a Polymer Electrolyte Membrane Fuel Cell (PEMFC) separator, capable of improving corrosion resistance by removing a non-conductive film formed on the surface of the stainless steel and forming a new conductive film, while improving hydrophilicity and contact resistance without having to perform additional surface processing such as coating by stretching a stainless cold-rolled steel sheet to form a pattern through micro pits control on the surface of the steel sheet.

Further, the present disclosure is directed to providing a method of manufacturing the stainless steel for the PEMFC separator.

Technical Solution

According to an embodiment of the present disclosure, there is provided stainless steel for a Polymer Electrolyte Membrane Fuel Cell (PEMFC) separator, the stainless steel including: by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34% of Cr, 0 to 0.6% of V (excluding 0), 0 to 0.5% of Ti (excluding 0), 0 to 0.5% of Nb (excluding 0), and the remainder comprising iron (Fe) and other unavoidable impurities, wherein a plurality of patterns may be formed on a surface of the stainless steel in a direction that is inclined with respect to a rolling direction, and the plurality of patterns are arranged repeatedly in the rolling direction.

According to an embodiment of the present disclosure, the patterns may be formed in a direction that is inclined at 35 to 60 degrees with respect to the rolling direction.

According to an embodiment of the present disclosure, the patterns may be parallel to each other in the rolling direction.

According to an embodiment of the present disclosure, the patterns may intersect with each other in the rolling direction.

According to an embodiment of the present disclosure, micro pits may be formed on the surface of the stainless steel, and the patterns may have different area fractions of the micro pits.

According to an embodiment of the present disclosure, the patterns may have a width of 0.5 to 3 mm.

According to an embodiment of the present disclosure, the area fractions of the micro pits formed on the patterns may be in a range of 2 to 50%.

According to an embodiment of the present disclosure, a difference between the area fractions of the micro pits of the patterns may be 2% or more.

According to an embodiment of the present disclosure, an average diameter of the micro pits formed on the patterns may be in a range of 0.05 to 20 μm.

According to an embodiment of the present disclosure, the stainless steel may further include 0.05 to 2.5 wt % of Mo.

According to an embodiment of the present disclosure, a ratio of Cr hydroxide/Cr oxide contained in the passive film of the stainless steel may be in a range of 0.5 to 1.7.

According to an embodiment of the present disclosure, a thickness of the passive film of the stainless steel may be 3.5 nm or thinner (except for zero).

According to an embodiment of the present disclosure, a contact angle θ of the surface of the stainless steel may be 70 degrees or smaller.

According to an embodiment of the present disclosure, contact resistance of the stainless steel may be 10 mΩ·cm² or smaller.

According to an embodiment of the present disclosure, a corrosion potential of the passive film of the stainless steel may be 0.3 V (SCE) or higher.

According to an embodiment of the present disclosure, there is provided a method of manufacturing stainless steel with improved hydrophilicity and contact resistance for a Polymer Electrolyte Membrane Fuel Cell (PEMFC) separator, the method including: cold-rolling stainless steel comprising by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34% of Cr, 0 to 0.6% of V (excluding 0), 0 to 0.5% of Ti (excluding 0), 0 to 0.5% of Nb (excluding 0), and the remainder comprising iron (Fe) and other unavoidable impurities, to manufacture a stainless cold-rolled thin steel sheet; applying tension having elongation of 5% or less to the cold-rolled thin steel sheet; and forming a plurality of patterns on a surface of the cold-rolled thin steel sheet in a direction that is inclined with respect to a rolling direction, wherein the plurality of patterns are arranged repeatedly in the rolling direction.

According to an embodiment of the present disclosure, the method may further include: heat treatment operation of performing cold annealing on the cold-rolled thin steel sheet to form a first passive film on a surface of the cold-rolled thin steel sheet; and film reformation operation of reforming the first passive film to form a second passive film on the surface of the cold-rolled thin steel sheet.

According to an embodiment of the present disclosure, the heat treatment operation and the film reformation operation may be performed after tension is applied to the cold-rolled thin steel sheet.

According to an embodiment of the present disclosure, the heat treatment operation and the film reformation operation may be performed before tension is applied to the cold-rolled thin steel sheet.

According to an embodiment of the present disclosure, the cold annealing may be bright annealing or continuous annealing.

According to an embodiment of the present disclosure, the film reformation operation may include: first film reformation operation of performing electrolytic treatment with first current density in a sulfuric acid solution; second film reformation operation of performing electrolytic treatment with second current density which is lower than or equal to the first current density in the sulfuric acid solution; and third film reformation operation of soaking the cold-rolled thin steel sheet in a mixed acid solution including nitric acid and hydrofluoric acid.

According to an embodiment of the present disclosure, the first film reformation operation and the second film reformation operation may be performed sequentially.

According to an embodiment of the present disclosure, in the first film reformation operation, a potential of the cold-rolled thin steel sheet corresponding to the first current density may satisfy Equation (1) and Equation (2) below:

$$E_{Cathode} \geq 1.0 \quad (1)$$

$$|E_{Cathode}| + |E_{anode}| \geq 2.0 \quad (2).$$

According to an embodiment of the present disclosure, in the first film reformation operation and the second film reformation operation, a concentration of the sulfuric acid solution may be in a range of 50 to 300 g/l, and temperature of the sulfuric acid solution may be in a range of 40 to 80° C.

According to an embodiment of the present disclosure, in the third film reformation operation, a concentration of the nitric acid in the mixed acid solution may be in a range of 100 to 200 g/l, a concentration of the hydrofluoric acid in the mixed acid solution may be 70 g/l or lower, and temperature of the mixed acid solution may be in a range of 40 to 60° C.

Advantageous Effects

According to the embodiments of the present disclosure, by removing a non-conductive film formed on the surface of the stainless steel and forming a new conductive film, it is possible to improve corrosion resistance, while securing hydrophilicity without having to perform additional surface processing such as coating, thereby reducing manufacturing cost and improving productivity. Further, it is possible to secure hydrophilicity of the surface of stainless steel for a Polymer Electrolyte Membrane Fuel Cell (PEMFC) separator to improve a water discharge characteristic upon application to the PEMFC separator, thereby stabilizing the performance of a fuel cell caused by the flooding phenomenon.

DESCRIPTION OF DRAWINGS

FIG. 1 is a cross-sectional view of a unit cell for describing a typical polymer fuel cell.

FIG. 2 is a perspective view showing a cathode and a gas diffusion layer for describing the generation and movement of water in a typical polymer fuel cell.

FIG. 3 is a cross-sectional view for describing a contact angle α of waterdrops of stainless steel for a Polymer Electrolyte Membrane Fuel Cell (PEMFC) separator according to an embodiment of the present disclosure.

FIG. 4 is a perspective view showing a cathode and a gas diffusion layer for describing the generation and movement of water in a PEMFC according to an embodiment of the present disclosure.

FIG. 5 is a picture obtained by photographing the surface of stainless steel for a PEMFC separator according to an embodiment of the present disclosure.

FIG. 6 is a picture obtained by photographing the surface of stainless steel for a PEMFC separator according to an embodiment of the present disclosure.

FIG. 7 is an optical picture obtained by photographing the surface of the stainless steel shown in FIG. 6 with an optical microscope.

FIG. 8 is a picture showing a distribution of micro pits, obtained through image analysis of an L area of FIG. 7.

FIG. 9 is a picture showing a distribution of micro pits, obtained through image analysis of an R area of FIG. 7.

FIG. 10 is a graph showing the results of analysis on the sizes and numbers of micro pits shown in FIGS. 8 and 9.

FIG. 11 is a schematic diagram of equipment for manufacturing stainless steel for a PEMFC separator according to an embodiment of the present disclosure.

MODES OF THE INVENTION

Stainless steel for a Polymer Electrolyte Membrane Fuel Cell (PEMFC) separator according to an embodiment of the present disclosure may include: by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34% of Cr, 0 to 0.6% of V (excluding 0), 0 to 0.5% of Ti (excluding 0), 0 to 0.5% of Nb (excluding 0), and the remainder comprising iron (Fe) and other unavoidable impurities, wherein a plurality of patterns may be formed on a surface of the stainless steel in a direction that is inclined with respect to a rolling direction, and the plurality of patterns are arranged repeatedly in the rolling direction.

MODES OF THE INVENTION

Hereinafter, the embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a cross-sectional view of a unit cell for describing a typical polymer fuel cell. FIG. 2 is a perspective view showing a cathode and a gas diffusion layer for describing the generation and movement of water in a typical polymer fuel cell.

Referring to FIG. 1, a Polymer Electrolyte Membrane Fuel Cell (PEMFC) may have a unit cell structure in which gas diffusion layers 22 and 23 and a separator 10 are stacked on both sides of a Membrane Electrode Assembly (MEA) 21 consisting of an electrolyte, an anode electrode, and a cathode electrode.

In the separator 10, a flow path for supplying fuel $H_2$ and air to the electrodes of the fuel cell and discharging water $H_2O$ which is an electrochemical reactant may be formed. The separator 10 may perform a function of mechanically supporting the MEA 21 and the gas diffusion layers 22 and 23, and a function of electrically connecting the unit cell to the adjacent unit cell.

The flow path of the separator 10 may be composed of a channel through which the fuel or air passes, and a land which is in contact with the gas diffusion layers 22 and 23 to function as an electrical passage. In order to stably supply reactants and discharge products, it may be very important to control the shape and surface state of the flow path.

Referring to FIG. 2, in a cathode separator 10A, since water is generated by an electrochemical reaction, waterdrops $H_2O$ may be generated by the condensation of water vapor in the inside of the channel, the gas diffusion layers 22 and 23, or the electrodes if the dew point temperature of reaction gas is higher than the operation temperature of the fuel cell. This is called a flooding phenomenon. Due to the flooding phenomenon, the reaction gas flows non-uniformly, and is also diffused insufficiently to cause the lack of the reaction gas in the electrodes, resulting in degradation in performance of the fuel cell.

The surface of the cathode separator 10A which is generally used may have low hydrophilicity so that it cannot secure the flow property of water $H_2O$ sufficiently. Accordingly, it is difficult to avoid the flooding phenomenon. That is, waterdrops $H_2O$ condensed on the surface of the cathode separator 10A may need to flow down to the flow path along an inclined surface in a direction that is opposite to the gas diffusion layer 22 with respect to the cathode separator 10A, and then be discharged. However, since the surface of the cathode separator 10A has low hydrophilicity, the contact angle of the waterdrops $H_2O$ may increase, so that the waterdrops $H_2O$ will not flow down until they reach a specific volume or more. Therefore, the waterdrops H₂O may be not smoothly discharged.

The flooding phenomenon may be also generated on the anode separator 10B by water passed through the electrolyte film, as well as on the cathode separator 10A. Particularly, when the gas flow path is clogged due to condensation water in the anode separator 10B, the lack of fuel gas may be caused, resulting in irreversible damage of the electrodes. This phenomenon is because when load current is forcedly applied in the lack of fuel gas, carbon supporting a catalyst of the anode reacts with water in order to produce electrons and protons in the state in which there is no fuel. As the result of the reaction, the catalyst of the anode side may be lost, which causes a reduction of an effective electrode area, resulting in degradation in performance of the fuel cell.

In order to prevent the flooding phenomenon, and to stabilize the performance of the fuel cell, a process for providing hydrophilicity to the surfaces to discharge water easily may be needed. That is, it is necessary to improve hydrophilicity of the surfaces of the cathode separator 10A and the anode separator 10B.

FIG. 3 is a cross-sectional view for describing a contact angle α of waterdrops of stainless steel for a PEMFC separator according to an embodiment of the present disclosure.

Referring to FIG. 3, stainless steel 10 for a PEMFC separator may include a stainless steel base material 11 and a passive film 12 formed on the stainless steel base material 11.

A contact angle α of a waterdrop on the surface of the stainless steel 10 may be 70 degrees or smaller. The contact angle α may be reduced by increasing hydrophilicity of the surface of the stainless steel 10. Details about an increase of surface hydrophilicity will be described later.

The stainless steel 10 may include by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34% of Cr, 0 to 0.6% of V (excluding 0), 0 to 0.5% of Ti (excluding 0), 0 to 0.5% of Nb (excluding 0), and the remainder comprising iron (Fe) and other unavoidable impurities.

Hereinafter, a reason for numerical limitation of element contents according to the embodiments of the present disclosure will be described. In the following description, a unit of weight percentage (wt %) will be used unless otherwise noted.

Carbon (C) and nitrogen (N) may form Cr carbonitride of the stainless steel 10. As a result, corrosion resistance of a layer with a lack of chrome (Cr) may be degraded. Accordingly, as the carbon (C) content and the nitrogen (N) content are lower, it will be more preferable. Therefore, in the present disclosure, the carbon (C) content may be limited to 0.02 wt % or less (except for zero), and the nitrogen (N) content may be preferably limited to 0.02 wt % or less (except for zero).

Although silicon (Si) is an element that is effective for deacidification, silicon (Si) suppresses toughness and formability, and SiO₂ oxide produced during annealing degrades conductivity and hydrophilicity of the product. Therefore, in the present disclosure, the silicon (Si) content may be preferably limited to 0.25 wt % or less.

Although manganese (Mn) is an element increasing deacidification, MnS which is an inclusion may reduce corrosion resistance. Therefore, in the present disclosure, the manganese (Mn) content may be preferably limited to 0.2 wt % or less.

Since phosphorus (P) reduces toughness as well as corrosion resistance, in the present disclosure, the phosphorus (P) content may be preferably limited to 0.04 wt % or less.

Sulfur (S) may form MnS, and MnS may become a start point of corrosion to thereby reduce corrosion resistance. Therefore, in the present disclosure, the sulfur (S) content may be preferably limited to 0.02 wt % or less.

Chrome (Cr) may be effective in forming Cr hydroxide which is effective for hydrophilicity, and prevent iron (Fe) from being eluted in an acidic atmosphere in which the fuel cell operates, thereby increasing corrosion resistance. However, if chrome (Cr) is excessively added, chrome (Cr) may reduce toughness. Therefore, in the present disclosure, the chrome (Cr) content may be preferably limited to 20 to 34 wt %.

Vanadium (V) may be effective in lowering the elution of iron (F) in an environment in which the fuel cell operates. However, if vanadium (V) is excessively added, vanadium (V) may degrade toughness. Therefore, in the present disclosure, the vanadium (V) content may be preferably limited to 0 to 0.6 wt %.

Although titanium (Ti) and niobium (Nb) are elements that are effective in forming carbonitride from carbon (C) and nitrogen (N) in the steel, titanium (Ti) and niobium (Nb) may degrade toughness. Therefore, in the present disclosure, the titanium (Ti) content and the niobium (Nb) content may be preferably limited to 0.5 wt % or less.

However, copper (Cu) is an element whose formability may deteriorate due to solid solution hardening, and nickel (Ni) is an element whose elution and formability may deteriorate when it is added by a small amount.

Accordingly, copper (Cu) and nickel (Ni) are considered as impurities in the present disclosure.

According to an embodiment of the present disclosure, the stainless steel 10 may further include molybdenum (Mo) of 0.05 to 2.5 wt %.

Molybdenum (Mo) may be added as an element for increasing corrosion resistance of the stainless steel 10. However, if molybdenum (Mo) is excessively added, toughness and hydrophilicity may be more or less degraded. Therefore, in the present disclosure, molybdenum (Mo) may be preferably limited to 0.05 to 2.5 wt %.

FIG. 4 is a perspective view showing a cathode and a gas diffusion layer for describing the generation and movement of water in a PEMFC according to an embodiment of the present disclosure. FIG. 5 is a picture obtained by photographing the surface of stainless steel for a PEMFC separator according to an embodiment of the present disclosure. FIG. 6 is a picture obtained by photographing the surface of stainless steel for a PEMFC separator according to an embodiment of the present disclosure. FIG. 7 is an optical picture obtained by photographing the surface of the stainless steel shown in FIG. 6 with an optical microscope. FIG. 8 is a picture showing a distribution of micro pits, obtained through image analysis of an L area of FIG. 7. FIG. 9 is a picture showing a distribution of micro pits, obtained through image analysis of an R area of FIG. 7. FIG. 10 is a graph showing the results of analysis on the sizes and numbers of micro pits shown in FIGS. 8 and 9.

Referring to FIGS. 4 to 10, on the surface of the stainless steel for the PEMFC separator, a plurality of patterns may be formed in a direction that is inclined with respect to a rolling direction. The patterns may be arranged repeatedly in the rolling direction.

The patterns may be formed in the direction that is inclined with respect to the rolling direction, and even after the separator is molded, the patterns may be provided in a direction that is inclined with respect to the sides of the separator. For example, the patterns may be formed in a direction that is inclined at 35 to 60 degrees with respect to the rolling direction.

If the angle of the patterns with respect to the rolling direction is smaller than 35 degrees or greater than 60 degrees, the micro fits may be nearly perpendicular to a flow direction of water, that is, a direction of the flow path for discharging water to the outside. In this case, the water discharge property may be degraded.

The patterns may be arranged two or more patterns repeatedly.

Referring to FIGS. 4 and 5, the patterns may include a first pattern P1, and a second pattern P2 formed adjacent to the first pattern P1. The first pattern P1 may be parallel to the second pattern P2 in the rolling direction. That is, the plurality of patterns may be formed in a direction that is diagonal to the rolling direction.

Referring to FIG. 6, for example, the patterns may include, as well as the first pattern P1 and the second pattern P2 formed adjacent to the first pattern P1, a third pattern P3 intersecting with the first pattern P1 and the second pattern P2, and a fourth pattern P4 formed adjacent to the third pattern P3.

The first pattern P1 may be parallel to the second pattern P2 in the rolling direction, and the third pattern P3 may be parallel to the fourth pattern P4 in the rolling direction. The first pattern P1 and the second pattern P2 may intersect with the third pattern P3 and the fourth pattern P4 in such a way to be symmetrical to the third pattern P3 and the fourth pattern P4. That is, the plurality of patterns may intersect with each other in the rolling direction to form a lattice type.

Referring to FIGS. 7 to 10, micro pits may be formed on the surface of the stainless steel, and the patterns may have different area fractions of micro pits.

The stainless steel 10 according to an embodiment of the present disclosure may need to increase the flow property of water or to reduce a contact angle of water with respect to the surface of the stainless steel 10, in order to prevent the flooding phenomenon when the fuel cell operates.

Since the micro pits are formed on the surface of the stainless steel 10 in order to improve the flow property of water, water generated according to a reaction of the electrodes of the fuel cell may be distributed finely on the separator.

Since the micro pits have different area fractions, water may be discharged along the inclined direction of the patterns, thereby maximizing the flow property of water.

Since the micro pits are formed on the surface of the stainless steel 10 according to an embodiment of the present disclosure in order to reduce the surface contact angle of the stainless steel 10, it is possible to control the roughness of the surface, and to reduce surface tension of waterdrops due to the capillary effect applied on the waterdrops by concave portions and convex portions existing within specific roughness. Accordingly, by controlling the contact angle of the surface of the stainless steel 10 to 70 degrees or smaller, it is possible to increase hydrophilicity.

For example, the patterns may have a width of 0.5 to 3 mm.

If the width of the patterns having different fractions of micro pits is in a range of 0.5 to 3 mm, the micro pits of the patterns may be formed alternately and repeatedly to thereby increase hydrophilicity.

For example, the area fractions of the micro pits formed on the patterns may be in a range of 2 to 50%.

If the area fractions of the micro pits are less than 2%, it may be difficult to form patterns having different area fractions of micro pits. Accordingly, it may be difficult to increase the flow property of water. Also, since the area fractions of micro pits are too small, it may be difficult to finely distribute water, and to obtain an effect of reducing contact resistance. If the area fractions of the micro pits exceed 50%, an effect of increasing hydrophilicity and an effect of reducing contact resistance may not increase greatly.

For example, a difference between the area fractions of the micro pits of the patterns may be 2% or more.

If the difference between the area fractions of the micro pits of the patterns is 2% or less, it may be difficult to form patterns having different area fractions of micro pits, and accordingly, it may be difficult to increase the flow property of water.

For example, an average diameter of the micro pits formed on the patterns may be in a range of 0.05 to 20 µm.

If the average diameter of the micro pits is smaller than 0.05 µm, there may be little effect of reducing contact resistance, and if the average diameter of the micro pits is larger than 20 µm, contact areas may increase due to the large sizes of the micro pits to thus increase contact resistance.

Accordingly, by forming the patterns having different distributions of micro pits on the surface of the stainless steel 10, water generated according to a reaction between the electrodes of the fuel cell may be distributed finely on the separator, and the water may be discharged along the inclined direction of the patterns formed according to different area fractions of the micro pits, thereby maximizing the flow property of water. Also, by controlling the fractions and sizes of the micro pits on the surface of the stainless steel to finely distribute water, it may be possible to increase the flow property of water, and to reduce contact resistance to 10 mΩ·cm² or lower.

Referring to FIG. 3, the stainless steel 10 for the PEMFC separator may include the stainless steel base material 11 and the passive film 12 formed on the stainless steel base material 11. A ratio of Cr hydroxide/Cr oxide contained in the passive film 12 of the stainless steel 10 may be in a range of 0.5 to 1.7, wherein the Cr hydroxide may be $Cr(OH)_3$.

An increase of hydrophilicity may be achieved by controlling components of the passive film 12 formed on the surface of the stainless steel 10.

If the ratio of Cr hydroxide/Cr oxide contained in the passive film 12 is smaller than 0.5, a contact angle of the passive film 12 may exceed 70 degrees so that sufficient hydrophilicity the present disclosure requires cannot be obtained. Also, if the ratio of Cr hydroxide/Cr oxide contained in the passive film 12 is greater than 1.7, hydrophilicity may be lost in a strong acidic environment which is the operating environment of fuel cells since Cr hydroxide is thermodynamically unstable than Cr oxide. Accordingly, in the present disclosure, the ratio of Cr hydroxide/Cr oxide contained in the passive film 12 may be limited to 0.5 to 1.7.

For example, the thickness of the passive film 12 may be 3.5 nm or thinner (except for zero). In the case of a typical stainless cold-rolled thin steel sheet, interfacial contact resistance increases by a passive film of a few nanometers (nm) in thickness formed on the surface. Since the passive film 12 of the stainless steel 10 according to an embodiment of the present disclosure is thinned to 3.5 nm or thinner, an effect of reducing contact resistance by thinning of a passive film having a semiconductive characteristic close to insulation may be obtained.

For example, a corrosion potential of the passive film 12 may be 0.3 V (SCE) or higher. The corrosion potential was obtained by cutting a steel sheet material of 0.1 mm in thickness to an area of cm², soaking the steel sheet material at 70° C. in a mixture solution of 1 mole of sulfuric acid and 2 ppm of hydrofluoric acid, which is an operating environment of fuel cells, and then evaluating the potential of the resultant material compared to a saturated calomel electrode (SCE) which is a reference electrode. That is, the stainless steel 10 according to an embodiment of the present disclosure can secure a corrosion potential of 0.3 V (SEC) or higher compared to the saturated calomel electrode (SCE) which is a reference electrode Also, the passive film 12 may maintain interfacial contact resistance of 10 mΩ·cm² or smaller at contact pressure of 100 N/cm², and accordingly, a target value for commercialization of a PEMFC separator can be achieved.

That is, the stainless steel for the PEMFC separator according to an embodiment of the present disclosure may include a passive film having hydrophilicity, conductivity, corrosion resistance, and low contact resistance.

FIG. 11 is a schematic diagram of equipment for manufacturing stainless steel for a PEMFC separator according to an embodiment of the present disclosure.

Hereinafter, a method of manufacturing stainless steel for a PEMFC separator according to an embodiment of the present disclosure will be described in detail with reference to FIG. 11.

The stainless steel for the PEMFC separator may be manufactured as a cold-rolled thin steel sheet through hot-rolling and cold-rolling.

Thereafter, the cold-rolled thin steel sheet may be subject to cold annealing heat treatment to form a first passive film on the surface of the cold-rolled thin steel sheet. For example, the cold annealing may be bright annealing or continuous annealing. Preferably, the cold annealing may be bright annealing.

Since bright annealing heat treatment is performed in a reducing atmosphere, a stainless steel sheet on which a passive film of a few nm in thickness having a smooth surface is formed, instead of a high-temperature oxidization scale type of a few μm in thickness generally formed in an oxidizing atmosphere, may be manufactured. However, the passive film of a few nm in thickness, formed by the bright annealing heat treatment, shows a high electric resistivity characteristic due to the semiconductive characteristic, and when the passive film is used as a PEMFC separator, the passive film may degrade the performance of the PEMFC due to its high interfacial contact resistance. Accordingly, post-processing for improving the interfacial contact resistance and corrosion resistance of the passive film formed by bright annealing heat treatment may be additionally needed.

The cold-rolled thin steel sheet may include by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34% of Cr, 0 to 0.6% of V (excluding 0), 0 to 0.5% of Ti (excluding 0), 0 to 0.5% of Nb (excluding 0), and the remainder comprising iron (Fe) and other unavoidable impurities. The individual elements have been described above.

Therefore, in the stainless steel for the PEMFC separator according to the present disclosure, the passive film having hydrophilicity and conductivity may be formed through a process which will be described below.

In order to form the passive film having conductivity, the first passive film may be reformed to form a second passive film 12 on the surface of the cold-rolled thin steel sheet.

The first passive film may be formed by first film reformation operation 100 of performing electrolytic treatment with first current density in a sulfuric acid solution, second film reformation operation 200 of performing electrolytic treatment with second current density which is lower than or equal to the first current density in the sulfuric acid solution, and third film reformation operation 400 of soaking the film in a mixed acid solution including nitric acid and hydrofluoric acid.

The first film reformation operation 100 and the second film reformation operation 200 may be performed sequentially.

That is, if the cold-rolled thin steel sheet on which the first passive film is formed is subject to the first film reformation operation 100, the first passive film may be removed. If the cold-rolled thin steel sheet from which the first passive film has been removed is subject to the second film reformation operation 200, iron (Fe) on the surface of the cold-rolled thin steel sheet may be selectively eluted, and accordingly, chrome (Cr) may be enriched on the surface of the cold-rolled thin steel sheet to form a Cr-rich layer.

In the first film reformation operation 100 and the second film reformation operation 200, electrolytic treatment may be performed in the sulfuric acid solution. More specifically, in the first film reformation operation 100, electrolytic treatment may be performed with first current density, and in the second film reformation operation 200, electrolytic treatment may be performed with second current density that is lower than or equal to the first current density.

In the first film reformation operation 100, a potential of the cold-rolled thin steel sheet corresponding to the first current density may satisfy Equation (1) and Equation (2) below.

$$E\ \text{Cathode} \geq 1.0 \tag{1}$$

$$|E_{Cathode}| + |E_{anode}| \geq 2.0 \tag{2}$$

In the first film reformation operation 100, the first current density at which upon intersecting electrolytic treatment of the anode and cathode electrodes, a sum of absolute values of $E_{cathode}$ and $E_{anode}$ is higher than or equal to 2.0 V (SCE), or upon electrolytic treatment of the cathode electrode, the E cathode is higher than or equal to 1.0 V (SCE) may be preferably applied.

If the sum of the absolute values of $E_{cathode}$ and $E_{anode}$ is higher than or equal to 2.0 V (SCE) or if $E_{cathode}$ is higher than or equal to 1.0 V (SCE), dissolution of the cathode of the cold-rolled thin steel sheet may be generated at a high potential area of +1.0 V (SCE) or higher so that the passive film may be dissolved uniformly over the entire surface. Accordingly, it is possible to uniformly remove the nonconductive passive film, while suppressing erosion of the cold-rolled thin steel sheet. If the sum of the absolute values of $E_{cathode}$ and $E_{anode}$ is lower than 2.0 V (SCE) or if $E_{cathode}$ is lower than 1.0 V (SCE), the passive film may be removed non-uniformly to thus degrade the effect of reducing contact resistance.

For example, in the first film reformation operation 100, the concentration of the sulfuric acid solution may be preferably adjusted to 50 to 300 g/l, and the temperature of the sulfuric acid solution may be preferably adjusted to 40 to 80° C.

If the concentration of the sulfuric solution is lower than 50 g/l, the first passive film subject to bright annealing on the surface of the cold-rolled thin steel sheet may be removed insufficiently. Meanwhile, if the concentration of the sulfuric acid solution is higher than 300 g/l, the effect of removing the first passive film may be saturated. Accordingly, the concentration of the sulfuric acid solution may be preferably limited to 300 g/l or lower in consideration of economics of electrolytic treatment.

If the temperature of the sulfuric acid solution is lower than 40° C., the effect of removing the passive film may be degraded, and accordingly, the upper temperature limit of the sulfuric acid solution may be preferably 80° in consideration of safety.

After the first film reformation operation 100, operation (that is, the second film reformation operation 200) of performing electrolytic treatment on the cold-rolled thin steel sheet from which the first passive film has been removed in the sulfuric acid solution to increase a Cr content on the surface of the cold-rolled thin steel sheet may be performed.

The second current density which is current density of the second film reformation operation 200 may be lower than or equal to the first current density which is current density of the first film reformation operation 100. More preferably, the second current density which is current density of the second film reformation operation 200 may be lower than the first current density which is current density of the first film reformation operation 100.

Since the first passive film subject to bright annealing has been removed in the first film reformation operation 100, the base material of the stainless steel 10 may be exposed to the outside in the second film formation operation 200. Therefore, if the current density of the second film reformation operation 200 is higher than the current density of the first film reformation operation 100, the elution of the base material may become serious. In this case, it may be hard to expect an effect of increasing the Cr content. Accordingly, in the second film reformation operation 200, lower current density may be applied than in the first film reformation operation 100 to selectively elute an appropriate amount of Fe, thereby increasing the Cr content on the surface of the stainless steel base material.

For example, in the second film reformation operation 200, the concentration of the sulfuric acid solution may be preferably adjusted to a range of 50 to 300 g/l, and the temperature of the sulfuric acid solution may be preferably adjusted to a range of 40 to 80° C.

If the concentration of the sulfuric acid solution is lower than 50 g/l, the selective elution amount of Fe of the stainless steel base material may become small so that an increase of the Cr content may be insufficient. Also, if the concentration of the sulfuric acid solution is higher than 300 g/l, the stainless steel base material may be seriously eroded so that it is hard to expect the effect of increasing the Cr content on the surface.

Also, if the temperature of the sulfuric acid solution is lower than 40° C., the effect of increasing the Cr content on the surface may be degraded. Accordingly, the upper temperature limit of the sulfuric acid solution may be preferably 80° C. in consideration of safety.

Also, when the first film reformation operation 100 and the second film reformation operation 200 are performed, bubbles generated on the surfaces of the cold-rolled thin steel sheet and the electrodes may be removed by making the sulfuric acid solution flow in an electrolyzer accommodating the sulfuric acid solution.

In the first film reformation operation 100 and the second film reformation operation 200, the bubbles generated on the surfaces of the cold-rolled thin steel sheet and the electrodes upon electrolytic treatment may degrade the efficiency of the electrolytic treatment, and become a main factor of making a stain or mark on the surface of the cold-rolled thin steel sheet. Accordingly, it may be preferable to remove bubbles generated upon electrolytic treatment. By making the solution flow in the electrolyzer upon electrolytic treatment, bubbles generated on the surfaces of the cold-rolled thin steel sheet and the electrodes may be mechanically removed. As a method of making the solution flow in the electrolyzer, a method of circulating the sulfuric acid solution with a pump to spray the sulfuric acid solution toward the surfaces of the cold-rolled thin steel sheet and the electrodes through a nozzle may be preferably used.

Meanwhile, a method of manufacturing the stainless steel for the PEMFC separator according to an embodiment of the present disclosure may further include operation 400 of soaking the cold-rolled thin steel sheet in a mixed acid solution in which a nitric acid solution is mixed with a hydrofluoric acid solution to form a new film. That is, third film reformation operation 400 of removing the first passive film, and soaking the stainless steel base material on which the Cr-rich layer is formed in a mixed acid solution including nitric acid and hydrofluoric acid may be performed to form a second passive film 12.

For example, in the third film reformation operation 400, a concentration of the nitric acid in the mixed acid solution may be preferably in a range of 100 to 200 g/l, a concentration of the hydrofluoric acid in the mixed acid solution may be preferably 70 g/l or lower, and temperature of the mixed acid solution may be preferably in a range of 40 to 60° C.

In the third film reformation operation 400, during an initial period when the stainless steel base material is soaked in the mixed acid solution, Fe may be selectively eluted, and an insoluble Si oxide remaining on the surface may be dissolved so that the Cr content on the surface may increase. During the latter period, the second passive film 12 which is a new film may be formed by the enriched Cr, so that a surface potential of the cold-rolled thin steel sheet may increase.

If the concentration of the nitric acid in the mixed acid solution is too low, the Cr content on the surface may increase, or the new passive film may be formed with low efficiency to degrade the effect of reducing contact resistance. Meanwhile, if the concentration of the nitric acid in the mixed acid solution is too high, the effect of increasing the Cr content on the surface may be saturated, or the erosion of the stainless steel base material may become serious to degrade the effect of reducing contact resistance. Therefore, the concentration of the nitric acid in the mixed acid solution may be preferably limited to a range of 100 to 200 g/l.

In the third film reformation operation 400, insoluble oxide not removed in the previous operation may be dissolved directly by the hydrofluoric acid, or may peel off and be removed upon the elution of the stainless steel base material.

Also, the hydrofluoric acid may react with eluted metal ions to help remove the metal ions, thereby increasing the effect of the nitric acid. Accordingly, if there is no insoluble oxide or if the effect of the nitric acid can be sufficiently obtained, the concentration of the hydrofluoric acid may be zero in the third film reformation operation 400. If the concentration of the hydrofluoric acid is too high, the erosion of the stainless steel may become serious. Therefore, the upper limit of the hydrofluoric acid may be preferably 70 g/l.

In the third film reformation operation 400, if the temperature of the mixed acid solution is lower than 40° C. or higher than 60° C., the effect of forming a new passive film may be degraded. Therefore, it may be preferable to limit the temperature range of the mixed acid solution.

If the temperature of the sulfuric acid solution is lower than 40° C., the effect of removing the passive film may be degraded. Therefore, the upper temperature limit of the sulfuric acid solution may be preferably 80° C. in consideration of safety.

Thereafter, the cold-rolled thin steel sheet may be washed, and dried with hot air at temperature of 300° C. or lower.

In order to further improve hydrophilicity of the stainless steel of the PEMFC separator according to an embodiment of the present disclosure, a pattern may be formed on the surface of the cold-rolled thin steel sheet.

Tension having elongation of 5% or less may be applied to the cold-rolled thin steel sheet to form a pattern on the surface of the cold-rolled thin steel sheet. In this process, a plurality of patterns may be formed in a direction that is inclined with respect to a rolling direction on the surface of the cold-rolled thin steel sheet. The patterns may be arranged repeatedly in the rolling direction. The tension may be applied in the rolling direction of the cold-rolled thin steel sheet.

If tension having elongation exceeding 5% is applied to the cold-rolled thin steel sheet, the elongation of the product may be degraded due to the excessive tension, thereby degrading formability. In this case, since no pattern is formed on the surface of the stainless steel, it may be difficult to improve the water discharge property.

In the stainless steel for the PEMFC separator according to an embodiment of the present disclosure, obtained after operation of applying tension to the cold-rolled thin steel sheet, patterns may be formed on the surface, as described above. Details about the patterns formed on the surface have been described above, and accordingly, a further description thereof will be omitted.

Operation of applying tension to the cold-rolled thin steel sheet may be performed after the cold-rolled thin steel sheet is manufactured.

For example, the heat treatment operation and the film reformation operation may be performed after tension is applied to the cold-rolled thin steel sheet. That is, the operation of applying tension to the cold-rolled thin steel sheet may be performed before the heat treatment operation and the film reformation operation are performed after the cold-rolled thin steel sheet is manufactured.

For example, the heat treatment operation and the film reformation operation may be performed before tension is applied to the cold-rolled thin steel sheet. That is, the operation of applying tension to the cold-rolled thin steel sheet may be performed after the cold-rolled thin steel sheet is manufactured and the heat treatment operation and the film reformation operation are performed.

For example, the operation of applying tension to the cold-rolled thin steel sheet may be performed between the heat treatment operation and the film reformation operation.

That is, the operation of applying tension to the cold-rolled thin steel sheet may be performed before the film reformation operation is performed, after the cold-rolled thin steel sheet is manufactured and the heat treatment operation is performed.

Hereinafter, the present disclosure will be described in more detail through embodiments below.

Steel of the Present Disclosure

Steel 1, steel 2, and steel 3 according to embodiments of the present disclosure may include composites shown in Table 1, and may be manufactured by manufacturing slabs through continuous casting, and then performing hot-rolling and cold-rolling to form cold-rolled thin steel sheets of 0.1 mmt in thickness.

TABLE 1

|  | C | N | Si | Mn | P | S | Cr | Mo | Ni | V | Ti | Nb |
|---|---|---|---|---|---|---|---|---|---|---|---|---|
| Steel 1 | 0.009 | 0.01 | 0.15 | 0.14 | 0.009 | 0.008 | 23 | — | — | 0.1 | 0.1 | 0.2 |
| Steel 2 | 0.01 | 0.011 | 0.14 | 0.12 | 0.01 | 0.009 | 28 | — | — | 0.2 | 0.15 | 0.15 |
| Steel 3 | 0.008 | 0.009 | 0.11 | 0.15 | 0.03 | 0.004 | 30 | — | — | 0.42 | 0.11 | 0.25 |

Hereinafter, the present disclosure will be described in more detail through the embodiments.

Embodiment 1

Ferritic stainless steel having a composite of the steel 1 was cold-rolled through a cold-rolling mill Z-mill, and subject to bright annealing heat treatment in a reducing atmosphere including hydrogen of 75 vol % and nitrogen of 25 vol %, thereby forming a cold-rolled thin steel sheet of 0.1 mm in thickness. Then, tension was applied to the cold-rolled thin steel sheet according to a condition shown in Embodiment 1 of Table 2 below to deform the cold-rolled thin steel sheet. Thereafter, first film reformation and second film reformation were performed in a sulfuric acid solution according to a condition shown in Table 3, and then third film reformation was performed by soaking the cold-rolled thin steel sheet in a mixed acid solution including nitric acid and hydrofluoric acid. Then, the physical properties of the resultant cold-rolled thin steel sheet were evaluated.

Embodiment 2

Embodiment 2 was performed under the same condition as Embodiment 1 except that tension is applied to the cold-rolled thin steel sheet of 0.1 mm in thickness according to a condition shown in Embodiment 2 of Table 2. Then, the physical properties of the resultant cold-rolled thin steel sheet were evaluated.

Embodiment 3

Embodiment 3 was performed under the same condition as Embodiment 1 except that tension is applied to the cold-rolled thin steel sheet of 0.1 mm in thickness according to a condition shown in Embodiment 3 of Table 2. Then, the physical properties of the resultant cold-rolled thin steel sheet were evaluated.

Embodiment 4

Ferritic stainless steel having a composite of the steel 2 was cold-rolled through a cold-rolling mill Z-mill, and subject to bright annealing heat treatment in a reducing atmosphere including hydrogen of 75 vol % and nitrogen of 25 vol %, thereby forming a cold-rolled thin steel sheet of 0.1 mm in thickness. Then, tension was applied to the cold-rolled thin steel sheet according to a condition shown in Embodiment 4 of Table 2 below to deform the cold-rolled thin steel sheet. Thereafter, first film reformation and second film reformation were performed in a sulfuric acid solution according to a condition shown in Table 3, and then third film reformation was performed by soaking the cold-rolled thin steel sheet in a mixed acid solution including nitric acid and hydrofluoric acid. Then, the physical properties of the resultant cold-rolled thin steel sheet were evaluated.

Embodiment 5

Embodiment 5 was performed under the same condition as Embodiment 4 except that tension is applied to the cold-rolled thin steel sheet of 0.1 mm in thickness according to a condition shown in Embodiment 5 of Table 2. Then, the physical properties of the resultant cold-rolled thin steel sheet were evaluated.

Embodiment 6

Embodiment 6 was performed under the same condition as Embodiment 4 except that tension is applied to a cold-rolled thin steel sheet of 0.1 mm in thickness according to a condition shown in Embodiment 6 of Table 2. Then, the physical properties of the resultant cold-rolled thin steel sheet were evaluated.

Embodiment 7

Ferritic stainless steel having a composite of the steel 3 was cold-rolled through a cold-rolling mill Z-mill, and subject to bright annealing heat treatment in a reducing atmosphere including hydrogen of 75 vol % and nitrogen of 25 vol %, thereby forming a cold-rolled thin steel sheet of 0.1 mm in thickness. Then, tension was applied to the cold-rolled thin steel sheet according to a condition shown in Embodiment 7 of Table 2 below to deform the cold-rolled thin steel sheet. Thereafter, first film reformation and second film reformation were performed in a sulfuric acid solution according to a condition shown in Table 3, and then third film reformation was performed by soaking the cold-rolled thin steel sheet in a mixed acid solution including nitric acid and hydrofluoric acid. Then, the physical properties of the resultant cold-rolled thin steel sheet were evaluated.

Embodiment 8

Embodiment 8 was performed under the same condition as Embodiment 7 except that tension is applied to the cold-rolled thin steel sheet of 0.1 mm in thickness according to a condition shown in Embodiment 8 of Table 2. Then, the physical properties of the resultant cold-rolled thin steel sheet were evaluated.

Embodiment 9

Embodiment 9 was performed under the same condition as Embodiment 7 except that tension is applied to the cold-rolled thin steel sheet of 0.1 mm in thickness according to a condition shown in Embodiment 9 of Table 2. Then, the physical properties of the resultant cold-rolled thin steel sheet were evaluated.

Comparative Example 1

Comparative Example 1 was performed under the same condition as Embodiment 1 except that tension is applied to the cold-rolled thin steel sheet of 0.1 mm in thickness according to a condition shown in Comparative Example 1 of Table 2. Then, the physical properties of the resultant cold-rolled thin steel sheet were evaluated.

Comparative Example 2

Comparative Example 2 was performed under the same condition as Embodiment 4 except that tension is applied to the cold-rolled thin steel sheet of 0.1 mm in thickness according to a condition shown in Comparative Example 2 of Table 2. Then, the physical properties of the resultant cold-rolled thin steel sheet were evaluated.

Comparative Example 3

Comparative Example 3 was performed under the same condition as Embodiment 7 except that tension is applied to the cold-rolled thin steel sheet of 0.1 mm in thickness according to a condition shown in Comparative Example 3 of Table 2. Then, the physical properties of the resultant cold-rolled thin steel sheet were evaluated.

TABLE 2

|  | Elongation (%) of Cold-rolled thin steel sheet |
|---|---|
| Embodiment 1 | 1 |
| Embodiment 2 | 2 |
| Embodiment 3 | 3 |
| Embodiment 4 | 1 |
| Embodiment 5 | 2 |
| Embodiment 6 | 3 |
| Embodiment 7 | 1 |
| Embodiment 8 | 2 |
| Embodiment 9 | 3 |
| Comparative Example 1 | — |
| Comparative Example 2 | 5.5 |
| Comparative Example 3 | — |

TABLE 3

| First Film Reformation Operation | | | Second Film Reformation Operation | | | Third Film Reformation Operation | | |
|---|---|---|---|---|---|---|---|---|
| Sulfuric Acid Concentration (g/l) | Sulfuric Acid Temperature (° C.) | $|E_{cathode}| + |E_{anode}|$ | Sulfuric Acid Concentration (g/l) | Sulfuric Acid Temperature (° C.) | Current Density Ratio | Nitric Acid Concentration (g/l) | Hydrofluoric Acid Concentration (g/l) | Mixed Acid Temperature (° C.) |
| 100 | 45 | 2.5 | 100 | 45 | 1.22 | 150 | 50 | 50 |

Herein, the current density ratio represents a value obtained by dividing the first current density of the first film reformation operation by the second current density of the second film reformation operation.

TABLE 4

| | Existence or Absence of Patterns | Pattern Width (mm) | Area Fractions (%) of Micro Pits Between Patterns | Average Diameter (μm) of Micro Pits | Average Area Fraction (%) of Micro Pits |
|---|---|---|---|---|---|
| Embodiment 1 | O | 0.5 | 5 | 0.8 | 8 |
| Embodiment 2 | O | 1 | 6 | 1.2 | 12 |
| Embodiment 3 | O | 3 | 13 | 4 | 15 |
| Embodiment 4 | O | 0.8 | 9.3 | 0.9 | 5 |
| Embodiment 5 | O | 1.2 | 8 | 1.2 | 14 |
| Embodiment 6 | O | 2.8 | 15 | 2.5 | 22 |
| Embodiment 7 | O | 0.9 | 3.5 | 0.7 | 7 |
| Embodiment 8 | O | 1.2 | 2 | 1.1 | 8 |
| Embodiment 9 | O | 1.9 | 5.8 | 1.35 | 13 |
| Comparative Example 1 | X | — | — | 0.003 | 1 |
| Comparative Example 2 | X | — | — | 0.04 | 1.2 |
| Comparative Example 3 | X | — | — | 0.01 | 0.9 |

TABLE 5

| | Contact Angle (°) | Contact Resistance (10 mΩ · cm$^2$) | Performance Reducing Rate (mV(@500 mA/cm$^2$)) |
|---|---|---|---|
| Embodiment 1 | 65 | 6.5 | 1 or less |
| Embodiment 2 | 64 | 6.5 | 1 or less |
| Embodiment 3 | 50 | 5.5 | 1 or less |
| Embodiment 4 | 47 | 5.5 | 1 or less |
| Embodiment 5 | 50 | 48 | 1 or less |
| Embodiment 6 | 55 | 4.4 | 1 or less |
| Embodiment 7 | 62 | 4.1 | 1 or less |
| Embodiment 8 | 55 | 4.2 | 1 or less |
| Embodiment 9 | 48 | 5.3 | 1 or less |
| Comparative Example 1 | 102 | 7.5 | 15 |
| Comparative Example 2 | 85 | 11 | 11 |
| Comparative Example 3 | 87 | 12 | 12 |

Table 4 and Table 5 show the results of measurement on the physical properties (pattern analysis, sizes of micro pits, fractions, contact angles, contact resistance, and performance reducing rates according to use of the fuel cell) of the stainless cold-rolled thin steel sheets manufactured according to Table 1 to Table 3.

The existence or absence of patterns was observed by the naked eye, and the pattern width was obtained by measuring intervals between the patterns of provided base test pieces, the intervals observed by the naked eye, in micrometer. The area fractions and diameters of micro pits in the patterns were obtained by measuring the surfaces of the test pieces using an optical microscope, and then measuring the average diameters (μm) and area fractions (%) of micro pits observed in the patterns using differences in color and contrast.

The contact angle was evaluated by cutting the test pieces according to the embodiments to a size of 20 cm$^2$, dropping distilled water of 3 μm in the shape of waterdrops on the surfaces of the test pieces at room temperature using equipment DSK 10-MK2 of KRUSS GmbH, and then measuring contact angles of the water with respect to the surfaces.

The contact resistance was evaluated by locating a gas diffusion layer (GDL 10-BA) of SGL at both sides of the materials, and using Au-coat Cu plates as current and voltage terminals to measure contact resistance between the gas diffusion layer and the stainless steel by a DC-4 probe method.

The performance of the fuel cells was measured by molding a test piece of 5 cm×5 cm, maintaining pressure of 1 atmosphere of reaction gas at operation temperature of 70° C. using a MEA of Gore, and supplying an amount of hydrogen and an amount of oxygen of 1.5 times and 2 times amounts of electrochemical consumption to the anode and cathode. Also, long-term performance was measured by measuring a performance reducing rate of a unit cell while maintaining current density of 500 mA/cm$^2$ (12.5 A) for 100 hours.

Accordingly, when tension of elongation of 5% or less is applied to stainless cold-rolled thin steel sheets having composites of the steel of the present disclosure, desired hydrophilicity and desired surface contact resistance can be obtained. Therefore, it is possible to improve a water discharge characteristic when the stainless steel is applied to the PEMFC separator, thereby preventing the flooding phenomenon. Accordingly, the result of evaluation on whether the performance of a fuel cell manufactured using the stainless steel according to the embodiments is maintained for 100 hours showed that the performance reducing rate of the fuel cell is smaller than or equal to 1 mV. The result means that there is no performance degradation.

That is, the stainless steel according to an embodiment of the present disclosure may secure hydrophilicity and contact resistance without having to perform separate surface processing such as coating on the surface of stainless steel for a PEMFC separator.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

The stainless steel for the PEMFC separator and the method of manufacturing the same, according to the embodiments of the present disclosure, may be applied to a PEMFC separator.

The invention claimed is:

1. Stainless steel with improved hydrophilicity and contact resistance for a Polymer Electrolyte Membrane Fuel Cell (PEMFC) separator, the stainless steel comprising:
by weight percent, 0 to 0.02% of C (excluding 0), 0 to 0.02% of N (excluding 0), 0 to 0.25% of Si (excluding 0), 0 to 0.2% of Mn (excluding 0), 0 to 0.04% of P (excluding 0), 0 to 0.02% of S (excluding 0), 20 to 34% of Cr, 0 to 0.6% of V (excluding 0), 0 to 0.5% of Ti (excluding 0), 0 to 0.5% of Nb (excluding 0), and the remainder comprising iron (Fe) and other unavoidable impurities,
wherein a plurality of patterns are formed on a surface of the stainless steel in a direction that is inclined with respect to a rolling direction, and the plurality of patterns are arranged repeatedly in the rolling direction, and
wherein micro pits are formed on the surface of the stainless steel, and the patterns have different area fractions of the micro pits.

2. The stainless steel of claim 1, wherein the patterns are formed in a direction that is inclined at 35 to 60 degrees with respect to the rolling direction.

3. The stainless steel of claim 1, wherein the patterns are parallel to each other in the rolling direction.

4. The stainless steel of claim 1, wherein the patterns intersect with each other in the rolling direction.

5. The stainless steel of claim 1, wherein the patterns have a width of 0.5 to 3 mm.

6. The stainless steel of claim 1, wherein the area fractions of the micro pits formed on the patterns are in a range of 2 to 50%.

7. The stainless steel of claim 6, wherein a difference between the area fractions of the micro pits of the patterns is 2% or more.

8. The stainless steel of claim 1, wherein an average diameter of the micro pits formed on the patterns is in a range of 0.05 to 20 μm.

9. The stainless steel of claim 1, further comprising molybdenum (Mo) of 0.05 to 2.5 wt %.

10. The stainless steel of claim 1, wherein a ratio of Cr hydroxide/Cr oxide contained in the passive film of the stainless steel is in a range of 0.5 to 1.7.

11. The stainless steel of claim 1, wherein a thickness of the passive film of the stainless steel is 3.5 nm or thinner (except for zero).

12. The stainless steel of claim 1, wherein a contact angle $\alpha$ of the surface of the stainless steel is 70 degrees or smaller.

13. The stainless steel of claim 1, wherein contact resistance of the stainless steel is 10 m$\Omega$cm$^2$ or smaller.

14. The stainless steel of claim 1, wherein a corrosion potential of the passive film of the stainless steel is 0.3 V (SCE) or higher.

* * * * *